US012639215B2

(12) United States Patent
Konan et al.

(10) Patent No.: US 12,639,215 B2
(45) Date of Patent: May 26, 2026

(54) DEALLOCATION OF A MEMORY DEVICE WITH A SEGMENTED MAPPING TABLE

(71) Applicant: MICRON TECHNOLOGY, INC., Boise, ID (US)

(72) Inventors: Andrei Konan, Meridian, ID (US); Randall David Barber, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/915,945

(22) Filed: Oct. 15, 2024

(65) Prior Publication Data

US 2026/0064585 A1     Mar. 5, 2026

Related U.S. Application Data

(60) Provisional application No. 63/688,512, filed on Aug. 29, 2024.

(51) Int. Cl.
*G06F 12/02* (2006.01)
*G06F 3/06* (2006.01)
(52) U.S. Cl.
CPC ........ *G06F 12/0246* (2013.01); *G06F 3/0604* (2013.01); *G06F 3/0659* (2013.01); *G06F 3/0673* (2013.01)

(58) Field of Classification Search
CPC .. G06F 12/0246; G06F 3/0604; G06F 3/0659; G06F 3/0673
See application file for complete search history.

(56) References Cited

U.S. PATENT DOCUMENTS

2019/0220396 A1 * 7/2019 Lin ..................... G06F 12/0246

FOREIGN PATENT DOCUMENTS

EP          4435579 A1 * 9/2024 ........... G06F 3/0679

* cited by examiner

*Primary Examiner* — Eric Cardwell
(74) *Attorney, Agent, or Firm* — Lowenstein Sandler LLP

(57) ABSTRACT

A host command to deallocate a memory device is received. A logical-to-physical (L2P) status data structure associated with a logical-to-physical (L2P) data structure is invalidated. The L2P mapping data structure includes a plurality of regions. Each region comprises a set of L2P address mappings and a region identifier identifying a respective region. The L2P status data structure includes a plurality of L2P status entries. An L2P status entry comprises a region identifier identifying a region of the plurality of regions of the L2P mapping data structure and a physical address identifying a location of the region of the L2P mapping data structure stored on the memory device. A host is notified that deallocation of the memory device is completed. Invalidation of the L2P mapping data structure is initiated.

20 Claims, 5 Drawing Sheets

300

| Region ID A | PA | Region State |
|---|---|---|
| Region ID B | PA | Region State |
| Region ID C | PA | Region State |
| . . . | . . . | . . . |
| Region ID n | PA | Region State |

| | | | | | | | | | | | | | |
|---|---|---|---|---|---|---|---|---|---|---|---|---|---|
| Entry 210A | ⋮ | Entry 210D | Region ID 230A | Entry 210D | ⋮ | Entry 210K | Region ID 230B | ⋮ | Entry 210n | ⋮ | Entry 210m | Region ID 230n |

Region 240A — Region 240B — Region 240n

300

| Region ID A | PA | Region State |
|---|---|---|
| Region ID B | PA | Region State |
| Region ID C | PA | Region State |
| . . . | . . . | . . . |
| Region ID n | PA | Region State |

FIG. 3

400

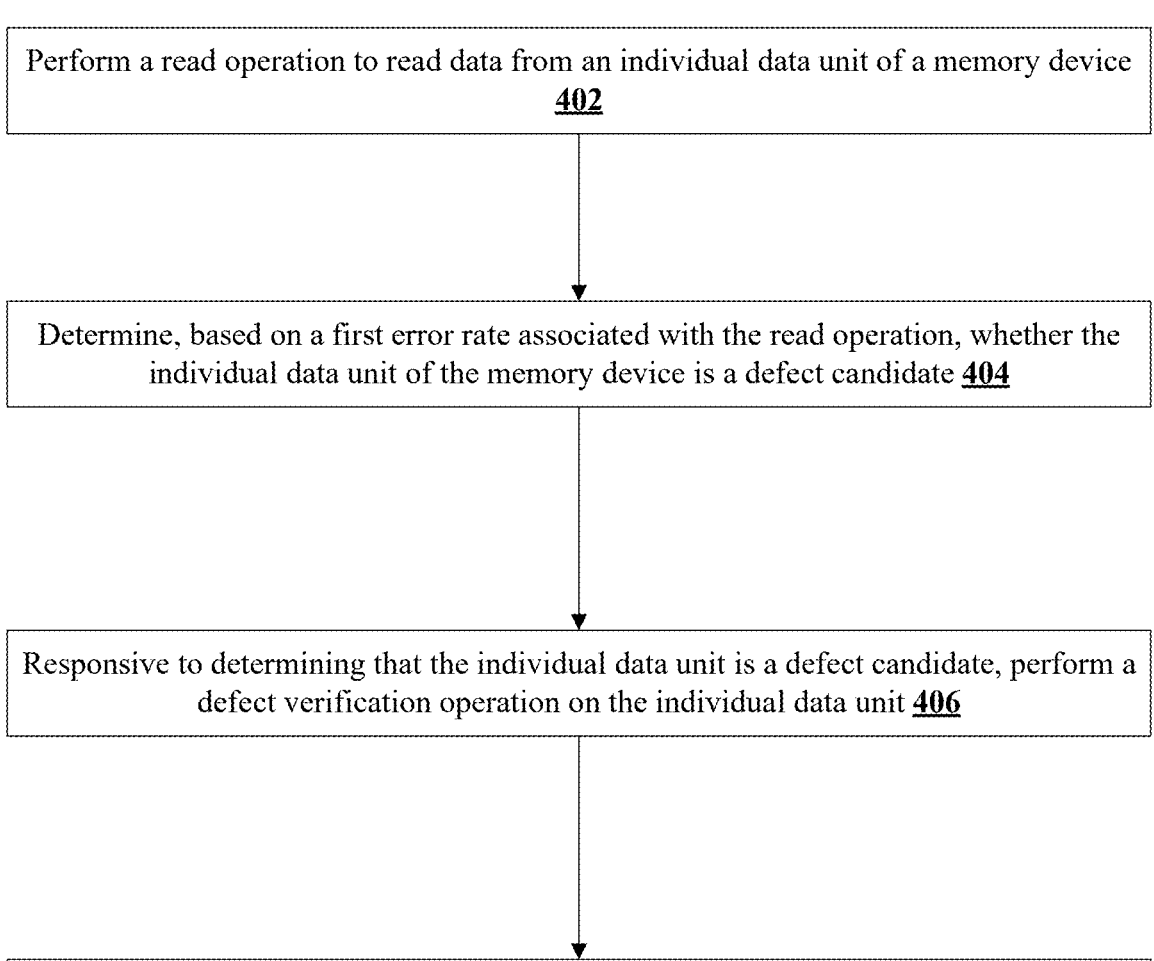

Perform a read operation to read data from an individual data unit of a memory device
402

Determine, based on a first error rate associated with the read operation, whether the individual data unit of the memory device is a defect candidate 404

Responsive to determining that the individual data unit is a defect candidate, perform a defect verification operation on the individual data unit 406

Determine, based on a second error rate associated with the defect verification operation, whether the individual data unit is defective 408

FIG. 4

DEALLOCATION OF A MEMORY DEVICE WITH A SEGMENTED MAPPING TABLE

RELATED APPLICATIONS

This application claims the benefit of U.S. Provisional Ser. No. 63/688,512, filed Aug. 29, 2024, which is incorporated by reference herein.

TECHNICAL FIELD

Embodiments of the disclosure relate generally to memory sub-systems, and more specifically, relate to deallocation of a memory device with a segmented mapping table.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 illustrates an example logical-to-physical (L2P) status table associated with the segmented mapping table of FIG. 2 in accordance with some embodiments of the present disclosure.

FIG. 4 is a flow diagram of an example method to deallocate a memory device of the memory sub-system of FIG. 1 in accordance with some embodiments of the present disclosure.

DETAILED DESCRIPTION

Figure 1:
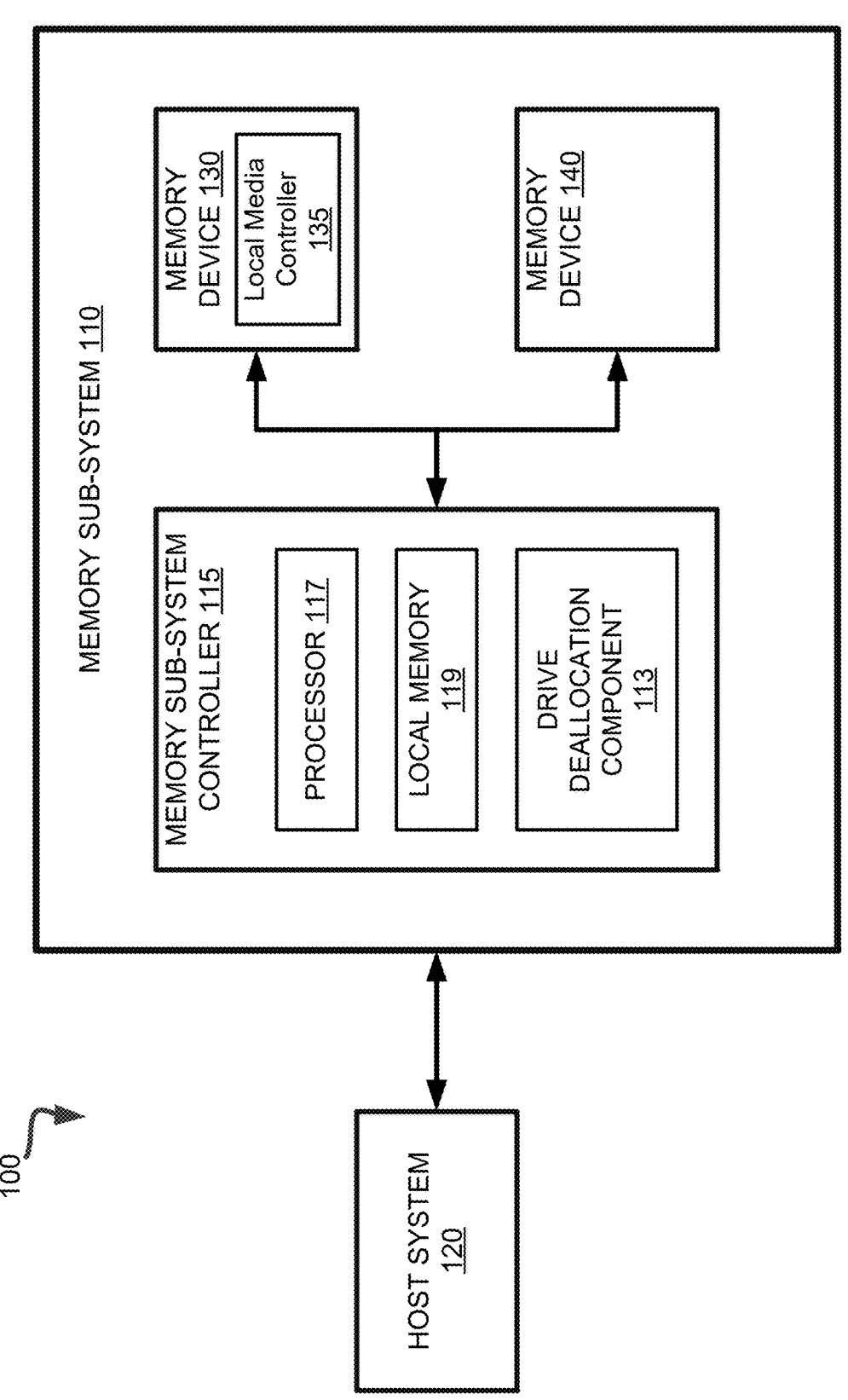
FIG. 1 illustrates an example computing system that includes a memory sub-system in accordance with some embodiments of the present disclosure.

Aspects of the present disclosure are directed to deallocation of a memory device with a segmented mapping table. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can includes of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of memory cells arranged in a two-dimensional or a three-dimensional grid. Memory cells are formed onto a silicon wafer in an array of columns and rows. The memory cells are joined by word-lines, which are conducting lines electrically connected to the control gates of the memory cells, and bitlines, which are conducting lines electrically connected to the drain electrodes of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Deallocation is the process of marking specific blocks, pages, or address ranges as no longer containing valid data, allowing the memory sub-system to repurpose these areas for future write operations. This process can be performed on various scales: specific logical block address (LBA) ranges, logical partitions of the memory device (e.g., namespaces), or the entire memory device. When deallocating an entire memory device, every LBA is effectively erased.

To expedite the deallocation process, especially for large-scale operations, the memory sub-system typically focuses on erasing the mapping table associated with the memory device. The mapping table maintains the relationship between logical addresses (used by the host system) and physical addresses (actual locations in the memory device) through numerous mapping entries.

During a full deallocation, a specific pattern (e.g., an invalid state represented by 0xFFFFFFFF) is written to every mapping entry in the table, effectively erasing all logical-to-physical mappings. To enhance the efficiency of this process, some memory sub-systems incorporate hardware-assisted direct memory access (DMA) acceleration. This feature allows for rapid filling of the entire mapping table with the specified pattern, significantly reducing the time required for large-scale deallocation operations.

In some instances, a segmented mapping table can be is used, which includes multiple segments referred to as "regions." Each region of the segmented mapping table has a predefined boundary (e.g., a 512-byte region boundary) divided into two sections: a first section allocated for mapping entries (e.g., the first 508 bytes of the 512-byte region), and a second section allocated for an identifier of the region (e.g., the last 4 bytes of the 512-byte region). The first section of a region includes one or more mapping entries that collectively do not exceed the allocated bytes. The second section contains a unique region identifier (e.g., region ID) for that specific region of the segmented mapping table.

This segmented structure presents unique challenges during full drive deallocation. Instead of rapidly filling the entire mapping table with a single specified pattern, a series of smaller operations can be performed to invalidate the segmented mapping table. Specifically, the process involves writing a specific pattern (e.g., 0xFFFFFFFF) to the first section of a region, followed by performing a stamp fill (e.g., writing region ID) for the second section of the region, and repeating these steps throughout the entire segmented mapping table. Consequently, rather than using large scope DMA commands to fill the entire mapping table quickly, numerous smaller DMA commands may be employed. This approach significantly extends the time needed to fill the table, transforming what would be a brief operation into a considerably longer process.

Aspects of the present disclosure address the above and other deficiencies by having a memory sub-system controller that invalidates, during a full deallocation, a logical-to-physical (L2P) status table associated with the segmented mapping table.

The L2P status table, similar to the mapping table, includes multiple consecutive entries. Each entry of the L2P status table can include a region ID, a physical address, and a region state. The region ID of an entry of the L2P status table corresponds to a region of the segmented mapping table. The physical address of the entry of the L2P status table specifies the memory device location storing the identified region of the segmented mapping table. The region state of the entry of the L2P status table may be a bit flag which can be set to one value (e.g., "1") indicating that the region in the segmented mapping table is allocated, or another value (e.g., "0") indicating that the region in the segmented mapping table has been deallocated. Thus, invalidating the L2P status table includes writing a specific pattern (e.g., 0xFFFFFFFF) to the physical address field of each entry of the L2P status table.

Once the L2P status table is invalidated, the host is notified that the memory device has been fully deallocated and the memory sub-system controller initiates invalidation of the segmented mapping table. The memory sub-system controller invalidates the segmented mapping table region by region, sequentially. As described above, each region, the memory sub-system controller writes a specific pattern (e.g., 0xFFFFFFFF) to each mapping entry of a first section of the respective region in the segmented mapping table, followed by writing a region ID of the respective region to the second section of the respective region in the segmented mapping table. Once the region has been invalidated, the memory sub-system controller identifies an entry of the L2P status table associated with the respective region and clears a region state of the identified entry to indicate that the region is deallocated (i.e., the bit value of the region state is set to "0" indicating that the identified region in the segmented mapping table has been deallocated).

In some embodiments, the memory sub-system controller may receive a memory access command (e.g., a read command or a write command) from the host system during invalidation of the segmented mapping table. The memory access command includes a logical address that identifies the specific location within the memory device where an operation associated with the memory access command (e.g., read or write operations) is to be performed. In response to receiving the memory access command during invalidation of the segmented mapping table, the memory sub-system controller identifies, in the segmented mapping table, a region including a mapping entry associated with the logical address (e.g., region of interest). The memory sub-system controller, using the L2P status table, determines whether the region of interest has been deallocated. In particular, the memory sub-system controller identifies an entry of the L2P status table associated with the region of interest and determines whether the region state of the entry indicates that the region of interest is deallocated. (i.e., the bit value of the region state is set to "0" indicating that the region of interest in the segmented mapping table has been deallocated).

Responsive to determining that the region of interest is not deallocated, the memory sub-system controller prioritizes deallocation of the region of interest. More specifically, prior to invalidating the next region in the sequence of regions of the segmented mapping table, the memory sub-system controller invalidates the region of interest. As noted above, invalidating the region of interest includes writing a specific pattern (e.g., 0xFFFFFFFF) to each mapping entry of a first section of the region of interest in the segmented mapping table, followed by writing a region ID of the region of interest to the second section of the region of interest in the segmented mapping table. Once the region of interest is invalidated, the memory sub-system controller identifies an entry of the L2P status table associated with the region of interest and clears a region state of the identified entry to indicate that the region is deallocated (i.e., the bit value of the region state is set to "0" indicating that the identified region in the segmented mapping table has been deallocated). The memory sub-system controller may than proceed with the operation associated with memory access command on the specific location within the memory device associated with the logical address.

Advantages of the present disclosure include, but are not limited to, reducing the amount of time required for deallocation of an entire memory device using segmented mapping table.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a drive deallocation component 113 that notify a host that memory device 130 and/or 140 has been deallocated in response to a deallocation command by invalidating a L2P status data structure associated with a segmented mapping table. In some embodiments, the memory sub-system controller 115 includes at least a portion of the drive deallocation component 113. In some embodiments, the drive deallocation component 113 is part of the host system 120, an application, or an operating system. In other embodiments, local media controller 135 includes at least a portion of drive deallocation component 113 and is configured to perform the functionality described herein.

Figure 2:
FIG. 2 illustrates an example segmented mapping table of a memory device in accordance with some embodiments of the present disclosure.

With reference to FIG. 2 which illustrates an example segmented mapping table 200 is divided into a plurality of regions (e.g., region 240A-n). Each region of the plurality of regions (e.g., region 240A-n) is a predefined size (e.g., 512 bytes) and includes a set of entries (e.g., entry 210A-D for region 240A, entry 210D-K for region 240B, . . . , and entry 210n-m for region 240n, respectively) and a region identifier (e.g., region ID 230A, region ID 230B, . . . , and region ID 230n, respectively). The number of entries in a particular region is defined by a size of each entry of the set of entries and a predefined portion of the predefined size of the region (e.g., 508 bytes). More specifically, each entry of the set of entries varies in size. Thus, collectively, a size of the set of entries must not exceed the predefined portion of the predefined size of the region in order to be included in the region. The remaining portion of the predefined size of the region is allocated to the region identifier.

With reference to FIG. 3 which illustrates an example L2P status table 300 associated with a segmented mapping table (e.g., a segmented mapping table of FIG. 2). The L2P status table 300 includes a plurality of entries. Each entry of the L2P status table 300 corresponds to a region of the plurality of regions of the segmented mapping table and includes a region identifiers of a region of the plurality of regions of the segmented mapping (e.g., region ID), a physical address (PA) indicating an actual locations in the memory device storing the region of the plurality of regions of the segmented mapping table, and a region state indicating whether the region of the plurality of regions in the segmented mapping table is allocated (e.g., bit value of "1") or deallocated (e.g., a bit value of "0").

Continuing with FIG. 1, the drive deallocation component 113, in response to a full deallocation command for the memory device 130 and/or 140, the L2P status table associated with the segmented mapping table is invalided. To invalidate the L2P status table, the drive deallocation component 113 writes a specific pattern (e.g., 0xFFFFFFFF) to a physical address of each entry of the L2P status table. The drive deallocation component 113 notifies the host that the memory device 130 and/or 140 has been fully deallocated.

The drive deallocation component 113 initiates invalidation of the segmented mapping table. The drive deallocation component 113 sequentially invalidates the segmented mapping table region by region. In particular, for each region of the plurality of regions, the drive deallocation component 113 writes a specific pattern (e.g., 0xFFFFFFFF) to each mapping entry of a respective region of the segmented mapping table. The drive deallocation component 113 writes a region ID of the respective region of the segmented mapping table. The drive deallocation component 113 identifies an entry of the L2P status table associated with the respective region. The drive deallocation component 113 clears a region state of the identified entry. Clearing the region state of the identified entry indicates that the respective region is deallocated.

In some embodiments, the memory sub-system controller 115 may receive a memory access command (e.g., a read command or a write command) from the host system 120. The memory access command includes a logical address that identifies the specific location within the memory device where an operation associated with the memory access command (e.g., read or write operations) is to be performed. The drive deallocation component 113, in response to receiving the memory access command during invalidation of the segmented mapping table, identifies a region of the segmented mapping table which includes a mapping entry associated with the logical address (e.g., region of interest). The drive deallocation component 113 identifies an entry of the L2P status table associated with the region of interest based on a region identifier of the region of interest. The drive deallocation component 113 determines whether the region state of the identified entry is cleared (e.g., indicating that the region of interest in the segmented mapping table has been deallocated).

Responsive to determining that the region of interest in the segmented mapping table has been deallocated, the drive deallocation component 113 invalidates the region of interest prior to invalidating (sequentially) the next region in the plurality of regions of the segmented mapping table. To invalidate the region of interest, the drive deallocation component 113 writes a specific pattern (e.g., 0xFFFFFFFF) to each mapping entry of the region of interest in the segmented mapping table, then a region ID of the region of interest to the region of interest in the segmented mapping table. The drive deallocation component 113, after the region of interest is invalidated, identifies an entry of the L2P status table associated with the region of interest using a region ID of the region of interest. The drive deallocation component 113 clears a region state of the identified entry to indicate that the region is deallocated. The drive deallocation component 113, after deallocation of the region of interest, the memory sub-system controller 115 performs the operation associated with memory access command on the specific location within the memory device 130 and/or 140 associated with the logical address.

FIG. 4 is a flow diagram of an example method 400 to deallocate a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the drive deallocation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a host command to deallocate a memory device.

At operation 420, the processing logic invalidates a logical-to-physical (L2P) status data structure associated with a logical-to-physical (L2P) data structure. The L2P mapping data structure can include a plurality of regions. Each region includes a set of L2P address mappings and a region identifier identifying a respective region. A number of L2P address mappings in the set of L2P address mappings for a region can be determined based on a predetermined region size and a size of each L2P address mapping of the set of L2P address mappings for the region The L2P status data structure can include a plurality of L2P status entries. An L2P status entry can include a region identifier identifying a region of the plurality of regions of the L2P mapping data structure and a physical address identifying a location of the region of the L2P mapping data structure stored on the memory device. The processing logic invalidates the L2P status data structure by setting a value of the physical address of a respective L2P status entry to a predetermined pattern and a region state of the respective L2P status entry to a first state for each L2P status entry of the plurality of L2P status entries.

At operation 430, the processing logic notifies a host that deallocation of the memory device is completed.

At operation 440, the processing logic initiates invalidation of the L2P mapping data structure. The processing logic invalidates the L2P mapping data structure by setting a value of each L2P address mapping of the set of L2P address mappings of a respective region to a predefined pattern for each region of the plurality of regions of the L2P mapping data structure. Then, the processing logic updates a region state of an L2P status entry of the L2P status data structure associated with the respective region to a second state responsive to setting the value of each L2P address mapping of the set of L2P address mappings of the respective region to the predefined pattern.

Depending on the embodiment, during invalidation of the L2P mapping data structure, the processing logic receives a memory access operation (e.g., a read operation or a write operation) identifying a logical address. The processing logic identifies, as a priority region, a region of the plurality of regions of the L2P mapping data structure including an L2P address mapping associated with the logical address. Responsive to determining that a region state of an L2P status entry of the L2P status data structure associated with the priority region is a first state, the processing logic invalidates the priority region prior to another region of the plurality of regions of the L2P mapping data structure and performs the memory access operation. The processing logic invalidates the priority region by setting a value of each L2P address mapping of the set of L2P address mappings of the priority region to a predefined pattern and updating a region state of the L2P status entry of the L2P status data structure associated with the priority region to a second state.

Figure 5:
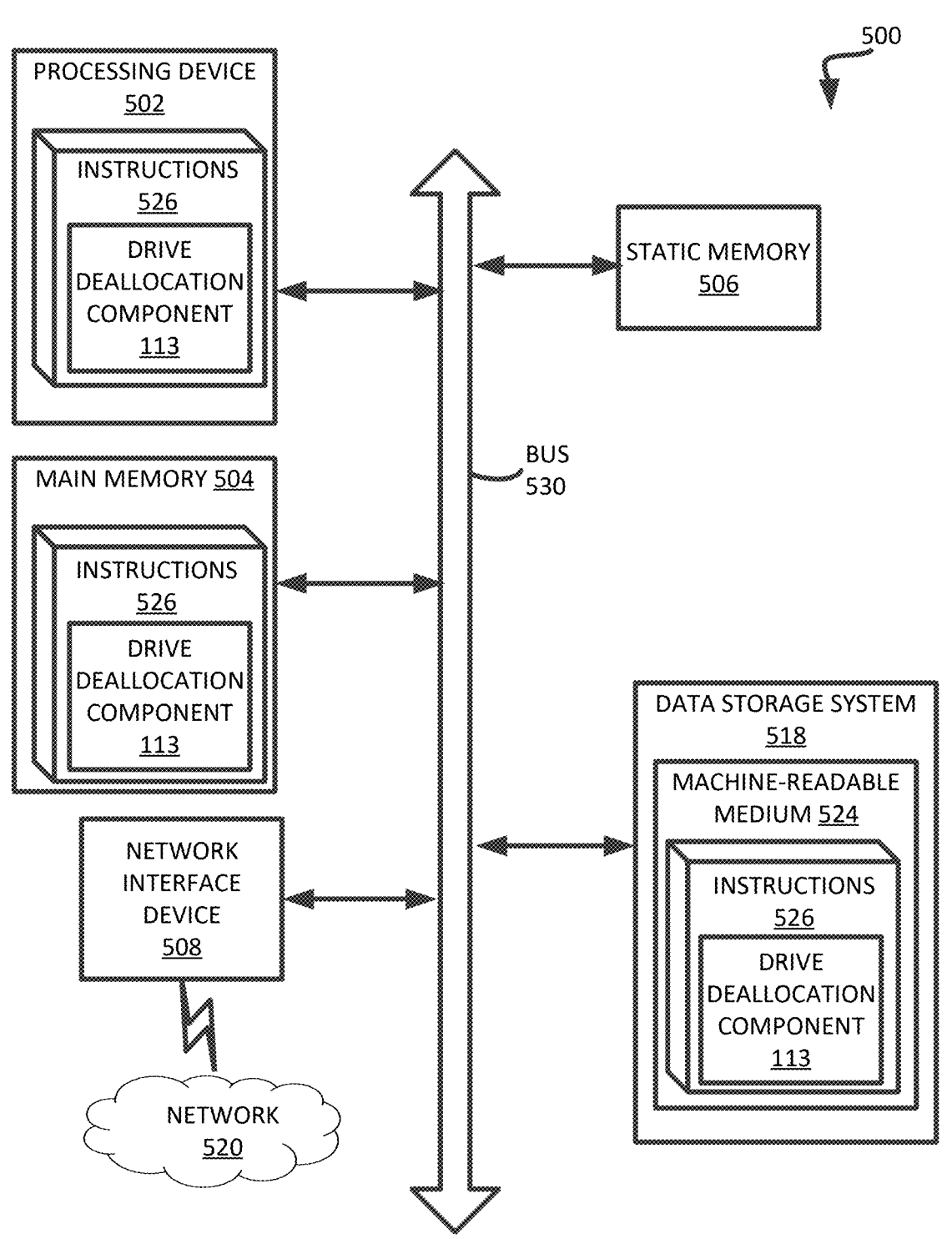
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the drive deallocation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a drive deallocation component (e.g., the drive deallocation component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

receiving a host command to deallocate a memory device;

invalidating a logical-to-physical (L2P) status data structure associated with a logical-to-physical (L2P) mapping data structure that is separate from the L2P status data structure, wherein:

the L2P mapping data structure is divided into a plurality of regions, wherein each region of the L2P mapping data structure comprises a first section allocated for a set of L2P address mappings and a second section allocated for a region identifier identifying a respective region, and the L2P status data structure includes a plurality of L2P status entries, wherein an L2P status entry comprises a region identifier identifying a region of the plurality of regions of the L2P mapping data structure, a physical address identifying a physical location of the memory device storing the region of the L2P mapping data structure, and a region state indicating whether the set of L2P address mappings associated with the region is allocated;

notifying a host that deallocation of the memory device is completed; and initiating invalidation of the L2P mapping data structure.

2. The method of claim 1, wherein invalidating the L2P status data structure comprises:

for each L2P status entry of the plurality of L2P status entries, setting a value of the physical address of a respective L2P status entry to a predetermined pattern and a region state of the respective L2P status entry to a first state.

3. The method of claim 1, wherein invalidating the L2P mapping data structure comprises:

for each region of the plurality of regions of the L2P mapping data structure, setting a value of each L2P address mapping of the set of L2P address mappings of a respective region to a predefined pattern; and responsive to setting the value of each L2P address mapping of the set of L2P address mappings of the respective region to the predefined pattern, updating a region state of an L2P status entry of the L2P status data structure associated with the respective region to a second state.

4. The method of claim 1, wherein a number of L2P address mappings in the set of L2P address mappings for a region is determined based on a predetermined region size and a size of each L2P address mapping of the set of L2P address mappings for the region.

5. The method of claim 1, further comprising:

during invalidation of the L2P mapping data structure, receiving a memory access operation identifying a logical address;

identifying, as a priority region, a region of the plurality of regions of the L2P mapping data structure including an L2P address mapping associated with the logical address;

responsive to determining that a region state of an L2P status entry of the L2P status data structure associated with the priority region is a first state, invalidating the priority region prior to another region of the plurality of regions of the L2P mapping data structure; and performing the memory access operation.

6. The method of claim 5, wherein invalidating the priority region comprises:

setting a value of each L2P address mapping of the set of L2P address mappings of the priority region to a predefined pattern; and updating a region state of the L2P status entry of the L2P status data structure associated with the priority region to a second state.

7. The method of claim 5, wherein the memory access operation is one of: a read operation or a write operation.

8. A system comprising:

a plurality of memory devices; and a processing device, operatively coupled with the plurality of memory devices, to perform operations comprising:

receiving a host command to deallocate a memory device;

invalidating a logical-to-physical (L2P) status data structure associated with a logical-to-physical (L2P) mapping data structure that is separate from the L2P status data structure, wherein:

the L2P mapping data structure is divided into a plurality of regions, wherein each region of the L2P mapping data structure comprises a first section allocated for a set of L2P address mappings and a second section allocated for a region identifier identifying a respective region, and the L2P status data structure includes a plurality of L2P status entries, wherein an L2P status entry comprises a region identifier identifying a region of the plurality of regions of the L2P mapping data structure, a physical address identifying a physical location of the memory device storing the region of the L2P mapping data structure, and a region state indicating whether the set of L2P address mappings associated with the region is allocated;

notifying a host that deallocation of the memory device is completed; and initiating invalidation of the L2P mapping data structure.

9. The system of claim 8, wherein invalidating the L2P status data structure comprises:

for each L2P status entry of the plurality of L2P status entries, setting a value of the physical address of a respective L2P status entry to a predetermined pattern and a region state of the respective L2P status entry to a first state.

10. The system of claim 8, wherein invalidating the L2P mapping data structure comprises:

for each region of the plurality of regions of the L2P mapping data structure, setting a value of each L2P address mapping of the set of L2P address mappings of a respective region to a predefined pattern; and responsive to setting the value of each L2P address mapping of the set of L2P address mappings of the respective region to the predefined pattern, updating a region state of an L2P status entry of the L2P status data structure associated with the respective region to a second state.

11. The system of claim 8, wherein a number of L2P address mappings in the set of L2P address mappings for a region is determined based on a predetermined region size and a size of each L2P address mapping of the set of L2P address mappings for the region.

12. The system of claim 8, wherein the processing device is to perform operations further comprising:

during invalidation of the L2P mapping data structure, receiving a memory access operation identifying a logical address;

identifying, as a priority region, a region of the plurality of regions of the L2P mapping data structure including an L2P address mapping associated with the logical address;

responsive to determining that a region state of an L2P status entry of the L2P status data structure associated with the priority region is a first state, invalidating the priority region prior to another region of the plurality of regions of the L2P mapping data structure; and performing the memory access operation.

13. The system of claim 12, wherein invalidating the priority region comprises:

setting a value of each L2P address mapping of the set of L2P address mappings of the priority region to a predefined pattern; and updating a region state of the L2P status entry of the L2P status data structure associated with the priority region to a second state.

14. The system of claim 12, wherein the memory access operation is one of: a read operation or a write operation.

15. A non-transitory computer-readable storage medium comprising instructions that, when executed by a processing device, cause the processing device to perform operations comprising:

receiving a host command to deallocate a memory device;

invalidating a logical-to-physical (L2P) status data structure associated with a logical-to-physical (L2P) mapping data structure that is separate from the L2P status data structure, wherein:

the L2P mapping data structure is divided into a plurality of regions, wherein each region of the L2P mapping data structure comprises a first section allocated for a set of L2P address mappings and a second section allocated for a region identifier identifying a respective region, and the L2P status data structure includes a plurality of L2P status entries, wherein an L2P status entry comprises a region identifier identifying a region of the plurality of regions of the L2P mapping data structure, a physical address identifying a physical location of the memory device storing the region of the L2P mapping data structure, and a region state indicating whether the set of L2P address mappings associated with the region is allocated;

notifying a host that deallocation of the memory device is completed; and initiating invalidation of the L2P mapping data structure.

16. The non-transitory computer-readable storage medium of claim 15, wherein invalidating the L2P status data structure comprises:

for each L2P status entry of the plurality of L2P status entries, setting a value of the physical address of a respective L2P status entry to a predetermined pattern and a region state of the respective L2P status entry to a first state.

17. The non-transitory computer-readable storage medium of claim 15, wherein invalidating the L2P mapping data structure comprises:

for each region of the plurality of regions of the L2P mapping data structure, setting a value of each L2P address mapping of the set of L2P address mappings of a respective region to a predefined pattern; and responsive to setting the value of each L2P address mapping of the set of L2P address mappings of the respective region to the predefined pattern, updating a region state of an L2P status entry of the L2P status data structure associated with the respective region to a second state.

18. The non-transitory computer-readable storage medium of claim 15, wherein a number of L2P address mappings in the set of L2P address mappings for a region is determined based on a predetermined region size and a size of each L2P address mapping of the set of L2P address mappings for the region.

19. The non-transitory computer-readable storage medium of claim 15, wherein the processing device is to perform operations further comprising:

during invalidation of the L2P mapping data structure, receiving a memory access operation identifying a logical address;

identifying, as a priority region, a region of the plurality of regions of the L2P mapping data structure including an L2P address mapping associated with the logical address;

responsive to determining that a region state of an L2P status entry of the L2P status data structure associated with the priority region is a first state, invalidating the priority region prior to another region of the plurality of regions of the L2P mapping data structure; and performing the memory access operation.

20. The non-transitory computer-readable storage medium of claim 19, wherein invalidating the priority region comprises:

setting a value of each L2P address mapping of the set of L2P address mappings of the priority region to a predefined pattern; and updating a region state of the L2P status entry of the L2P status data structure associated with the priority region to a second state.

* * * * *